UNITED STATES PATENT OFFICE.

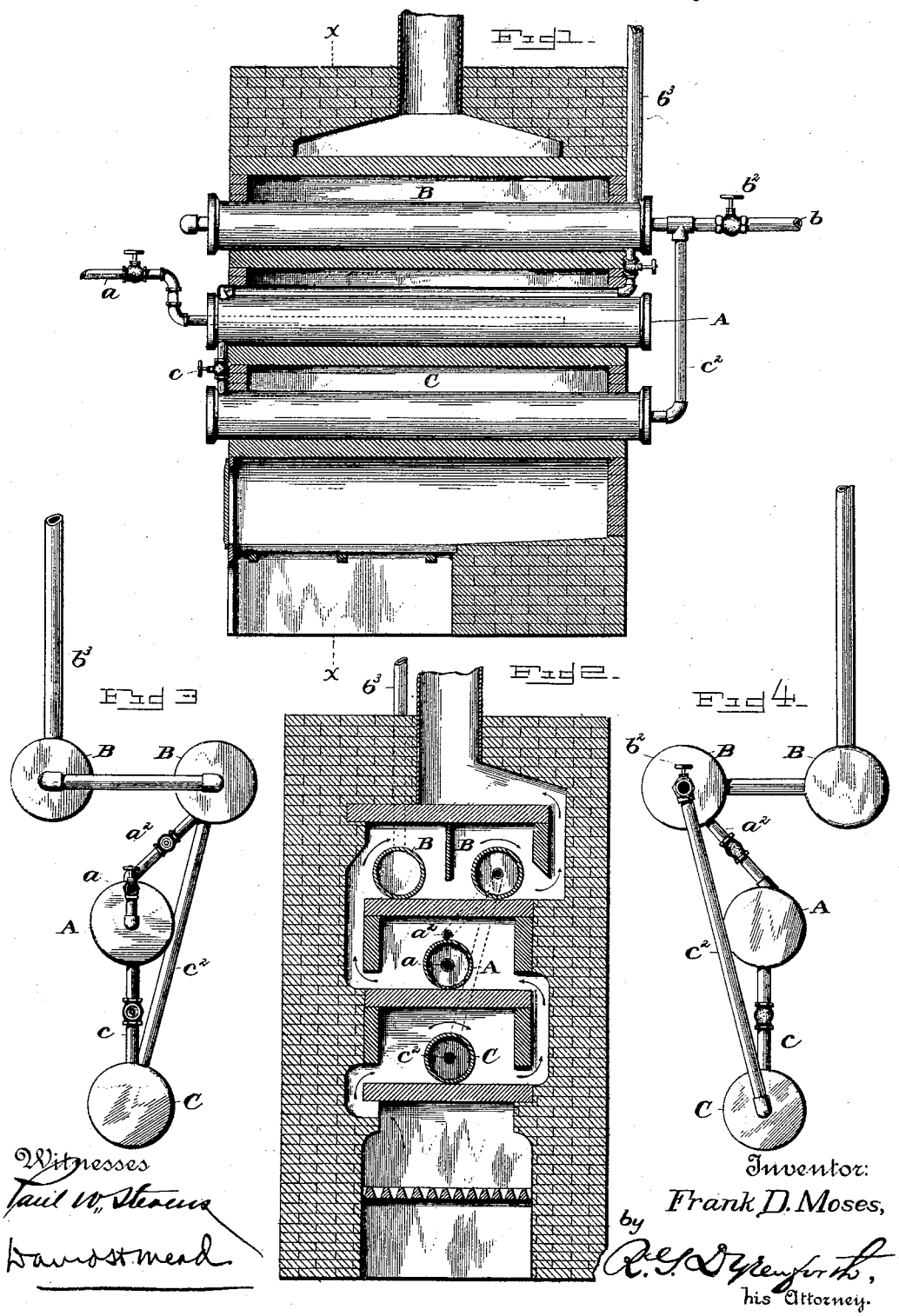

FRANK D. MOSES, OF CHICAGO, ILLINOIS, ASSIGNOR, BY DIRECT AND MESNE ASSIGNMENTS, TO THE UNIVERSAL GAS CONSTRUCTION COMPANY, OF SAME PLACE.

PROCESS OF MANUFACTURING GAS.

SPECIFICATION forming part of Letters Patent No. 479,293, dated July 19, 1892.

Application filed February 13, 1892. Serial No. 421,406. (No specimens.)

*To all whom it may concern:*

Be it known that I, FRANK D. MOSES, a citizen of the United States, residing at Chicago, in the county of Cook and State of Illinois, have invented certain new and useful Improvements in Processes of Manufacturing Gas; and I do declare the following to be a full clear, and exact description of the invention, such as will enable others skilled in the art to which it appertains to make and use the same, reference being had to the accompanying drawings, and to the letters of reference marked thereon, which form a part of this specification.

This invention relates to the manufacture of illuminating or fuel gas.

The object of the invention is in an inexpensive and a ready and efficient manner to produce an inflammable mixture of hydrocarbon with air so intimate that stratification or separation of the component parts will not subsequently occur.

With these objects in view the invention resides in a process of manufacturing a gaseous product which consists in first vaporizing any desirable hydrocarbonaceous matter at a suitable heat, then fixing the resulting vaporous product at a higher heat, and then mixing atmospheric air with the resulting gas, while both the air and the gas are subjected to a strong heat of a temperature below that of ignition of the mixture, whereby a thorough commingling and admixture of the gas and the air will ensue from the heat, the expansion of the air, and the mechanical motion among themselves of both ingredients, resulting in probable solution of the gas in the air or chemical union therewith.

In the accompanying drawings, forming part of this specification, and in which like letters of reference indicate corresponding parts, I have illustrated a form of apparatus capable of carrying my process into effect, although any other suitable form of apparatus may be employed.

In the drawings, Figure 1 is a view in vertical longitudinal section with parts in elevation, showing an arrangement of retorts in a furnace and conduits to and from them. Fig. 2 is a view in transverse section taken on the line $x\,x$ of Fig. 1 and looking toward the right, showing details of apparatus under a suitable construction to obtain the different relative heats. Figs. 3 and 4 are detail views of opposite ends of the retorts and connections detached from the furnace, the first being a view from the left-hand end of Fig. 1 and the second a view from the right-hand end thereof.

It has been observed that if hydrocarbon in the form of vapor or even in the form of gas is diluted with air under ordinary methods of mixture the hydrocarbon will separate from the air and even tend to condense to liquid.

The point of this invention is to effect such a thorough and intimate mixture of air, in any desired quantity, with gaseous hydrocarbon that the mixture will be more permanent, and I have ascertained that by mixing gaseous hydrocarbon with air while both the hydrocarbon and the air are subjected to heat this result is attained.

It is believed that by heating gaseous hydrocarbon and air together not only does the air so expand as to allow proper arrangement of the molecules of the hydrocarbon in its body as a vehicle, but the heat, besides exerting a dissolving action, causes such mechanical motion of the air and the hydrocarbon—that is, of the ingredients of the mixture among themselves—that a most intimate admixture results; but in mixing the hydrocarbon with air the precaution must be observed not to allow the heat of the containing-vessel to be raised high enough either to allow the hydrocarbon to become ignited and undergo combustion from the presence of oxygen in the air or to be injuriously decomposed with deposit of carbon that is broken up. The temperature of any suitable containing-vessel at which vaporous or gaseous hydrocarbon in the presence of oxygen would become ignited or at which it would become decomposed are known to science or those skilled in the art, so that it is not necessary to specify the same. Suffice it to say that the temperature applied to the admixture is considerably below that of incandescence of the containing-vessel and below that at which the hydrocarbonaceous substance has been vaporized.

The apparatus shown is to be employed as follows: Suitable hydrocarbonaceous matter—such as petroleum, rosin, rosin-oil, pitch, or suitable tar—is first supplied to the retort A by a feed-pipe or conduit $a$, and the retort is so located in the furnace as to be subjected to a heat sufficiently high to vaporize the hydrocarbonaceous substance, and, perhaps, effect some fixing of the vapor without causing decomposition or a deposit of carbon within the retort, the arrangement of the feed-pipe extending toward the farther end of the retort, with exit from the retort at the other end, aiding the desirable operation. To make an inflammable aeriform substance, the product may be led directly from the retort A by a pipe or conduit $a^2$ to the retort B, (which is here shown as a double retort,) located farther from the fire than the retort A; but this broader procedure of mine is not claimed in this one of my applications. It will be seen that the retort is in a situation to be strongly heated; but from its position it will not be heated too highly. Atmospheric air under pressure is admitted to this retort by a pipe or conduit $b$, and the supply will be regulated by a valve $b^2$. A thorough association of the vaporous hydrocarbon with the air will be effected in the retort B and the product will pass up the stand-pipe $b^3$ and may be led elsewhere for use. It will be clear that the candle-power of the resulting inflammable aeriform substance will depend upon the quantity of air admitted as regulated by the valve or the degree of dilution, care being taken not to admit a quantity of air too great for the capacity of the retort—that is to say, to admit only so much air as can be adequately heated.

To make a gaseous product, instead of leading the vaporous product direct from the retort A to the retort B the same will be first led to the retort C by a pipe or conduit $c$. The retort C is subjected to the greatest heat and is, properly speaking, a fixing-retort where the vaporous product coming from the retort A is converted into a permanent gas, this gas being then conducted by a pipe $c^2$ to the mixing-retort B to be associated with air in desirable proportions, as before described. It is of course to be understood that all induction and eduction pipes are to be provided with proper stop-cocks or valves to be properly employed, as will be well understood by those skilled in the art, and that the mixing-retort and the other retorts may be in any situation other than that shown, only so that they be subjected to proper heating.

It will be observed that in the present procedure hydrocarbon in liquid form is vaporized by itself in the vaporizing-retort without the presence or admission of air, steam, or any extraneous fluid, whereby a pure and rich hydrocarbon gas is first made by itself and any danger of explosion in the vaporizing-retort—as from the presence or admission of air or cooling of this retort or variation of its temperature, as from the presence or admission of steam—is avoided, although it is to be understood that steam may subsequently be employed to free the retort from any carbon deposit. It will further be observed that the mixture of hydrocarbon vapor with air is not effected during vaporization nor in a mixing-vessel prior to reheating, but that the hydrocarbon vapor, having been generated by itself, is conveyed before or after fixing to a heated mixing-vessel or reheater and there combined with air by itself, the air being unassociated with anything else and the hydrocarbon vapor being combined with the air under a defined heat applied simultaneously to both ingredients, whereby the air, having been cooler before entering the mixer, opens out, so to speak, to receive the molecules of hydrocarbon, and the application of heat to both ingredients simultaneously causes the same sort of mechanical admixture as there might be from inconceivably-rapid churning together of the two ingredients, and this without decomposition of the hydrocarbon.

Having thus fully described my invention, what I claim, and desire to secure by Letters Patent, is—

The process of manufacturing a gaseous product, which consists in first vaporizing any suitable hydrocarbonaceous matter at a proper heat, then fixing the resulting vaporous product at a higher heat, and then mixing atmospheric air in suitable quantity with the resulting gas, while both the air and the gas are subjected to a strong heat of a temperature below that of ignition of the mixture or of injurious decomposition of the gas, substantially as and for the purpose described.

In testimony whereof I affix my signature in presence of two witnesses.

FRANK D. MOSES.

Witnesses:
R. M. ELLIOTT,
E. M. DAWSON.